Dec. 6, 1938.   C. T. FOSS   2,138,912
SYNCHRONOUS CONTROL DEVICE
Filed July 29, 1936
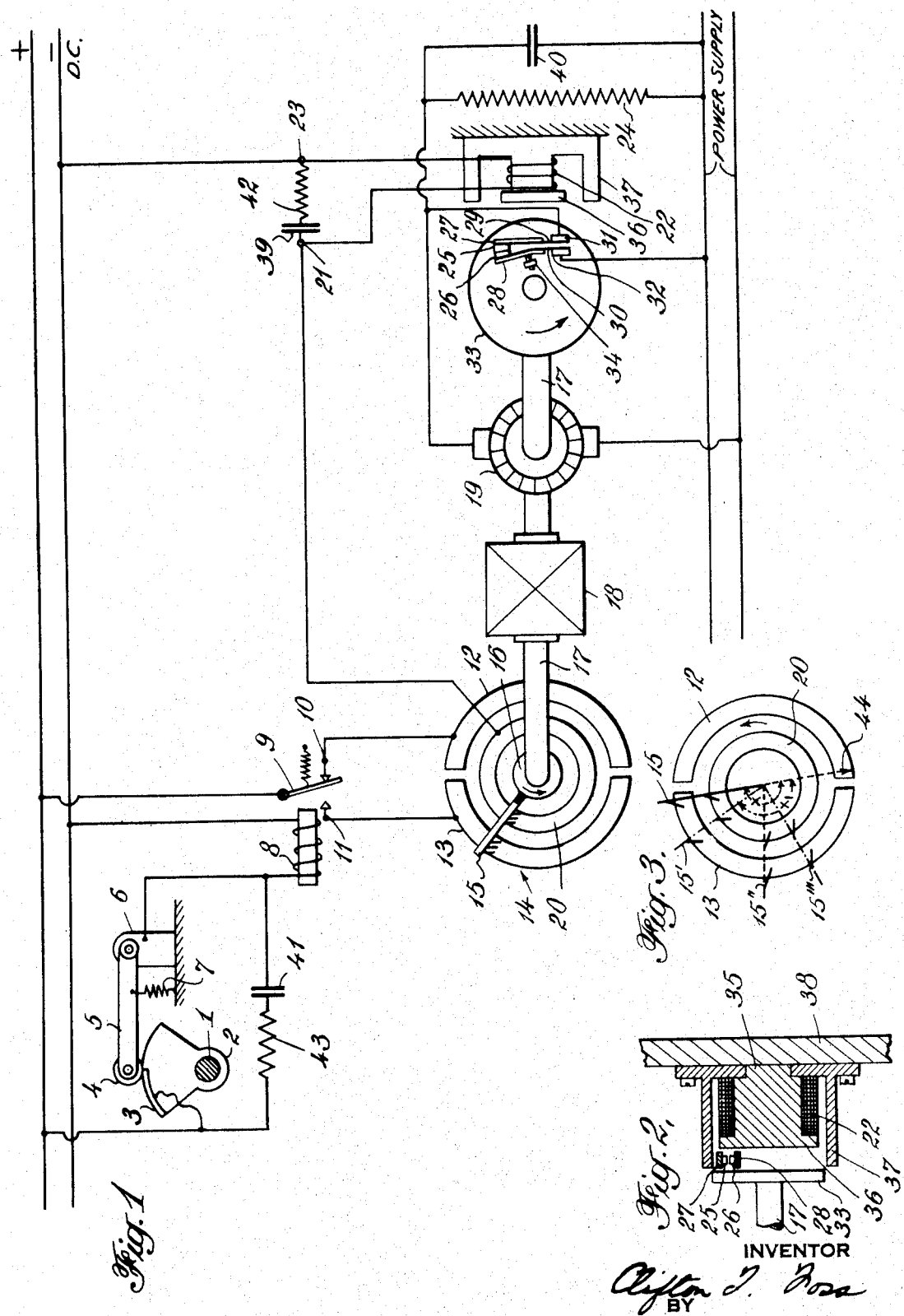
INVENTOR
Clifton T. Foss
BY
Hoguet, Neavy & Campbell
ATTORNEYS Patented Dec. 6, 1938

2,138,912

UNITED STATES PATENT OFFICE 2,138,912

SYNCHRONOUS CONTROL DEVICE

Clifton T. Foss, Stewart Manor, N. Y., assignor to Arma Engineering Co., Inc., Brooklyn, N. Y., a corporation of New York Application July 29, 1936, Serial No. 93,138

7 Claims. (Cl. 172—293)

This invention relates to a synchronous control device and has particular reference to a sensitive electromechanical means of synchronizing the movement of one rotating or reciprocating member with another having nearly constant frequency but feeble torque or power.

Where it is desirable to synchronize the movements of a secondary power member with the movements of a primary member having feeble power or torque, such as the escapement shaft of a clock, or the like, it is not only necessary to follow the movements of the delicate primary member in order that they may be employed for synchronizing purposes, but no disturbing load must be imposed on the feeble primary member which would affect its free operation and sensitivity, so that a true follow-up movement may be secured for synchronizing purposes. Frequently, the following movement of the secondary member is obtained at the expense of sensitivity and disturbance of the normal operation of the primary member, so that the entire system is unbalanced. Then there are extraneous disturbing forces, such as temperature changes, fluctuations in the line voltage of an electric follow-up control, and the like, which affect the accuracy of the following movement and consequently synchronization.

In accordance with the present invention, a highly sensitive synchronous control device is provided, which will synchronize the movements of a powered secondary member exactly with the movements of a feeble primary member, without imposing disturbing loads thereon; which, at the same time, will develop ample torque or power without sacrifice of sensitivity, and which is not affected by ambient temperature changes, load changes, or fluctuations in line voltages, where electrical power is employed for driving the following controlled member.

More particularly, the invention comprises essentially a substantially frictionless electrical switching means actuated by the primary controlling member for cyclically energizing alternate segments of a commutator at the same frequency as the primary controlling member; a brush engaging the commutator and rotated at approximately the same frequency by the secondary member, such as an electric motor having a centrifugal governor; and an electromagnet for controlling the equilibrium speed of the governor and consequently adjusting the speed of the motor, said electromagnet being energized only when the frequencies of the commutator energizing means and the rotating brush are out of phase. In this way, the motor rotation is maintained in exact synchronism with the oscillation or the movements of the primary controlling member, which may be the escapement shaft of a clock or any other member having a nearly constant frequency of movement.

It will be seen that with the new synchronous control device of this invention, feeble movements may be utilized to continuously and exactly synchronize the rotation of a motor of practically any power output with the movements of the primary member by controlling the speed governor thereof electromagnetically and in such a way that any tendencies toward speed changes due to line voltage fluctuations and temperature changes and load changes are automatically compensated for without requiring actual initiation of a speed change due to such causes before it can be rectified. Also, the device of this invention is readily adaptable to commercial motors supplied with centrifugal governors.

For a more complete understanding of the invention, reference may be had to the accompanying drawings, in which:

Figure 1 is a diagrammatic illustration of the synchronous control device of the invention as applied to an electric motor;

Fig. 2 is an axial section through the electromagnetic arrangement for controlling the speed governor of the motor; and, Fig. 3 is a diagrammatic representation of the cyclic relationship of the motor-driven brush on the escapement-controlled commutator.

Referring to Fig. 1, the oscillating escapement wheel shaft 1 of a clock, not shown, has securely fastened thereon a sector 2 of insulating material having upon one-half its periphery the metal contact segment 3. Contact roller 4 on the end of arm 5 pivoted on support 6 is held in contact with sector 2 by means of light spring 7, and is positioned to be centered on the sector 2 so that it is in contact with metallic portion 3 during one-half cycle of oscillation of the sector 2 and with the insulated portion thereof during the remaining half cycle. Segment 3 and roller 4 are electrically connected in series with relay coil 8 to form a circuit with a suitable source of electrical supply, preferably direct current. Thus, the pivoted armature 9 of the relay is caused alternately to make and break contact with contacts 10 and 11 for equal time intervals corresponding to one-half cycle of motion of escapement shaft 1.

Relay armature 9 is electrically connected to one side of a direct current supply, and contacts 10 and 11 are respectively electrically connected to segments 12 and 13 of commutator 14. Brush 15, fixed on insulated collar 16 secured to shaft 17, is rotated through an appropriate reduction gear 18 by electric motor 19, thus electrically connecting segments 12 and 13 successively to common conducting center ring 20, in turn connected in series with electromagnet coil 22 and the other side of the direct current supply.

The electric motor may be any type whose speed may be changed by the insertion of an impedance in the motor circuits. For the purposes of illustration, electric motor 19 is shown as a commutator type with series resistance 24, selected as described later, connected across contacts 25 and 26 of any conventional type of centrifugal governor fixed on the end of motor shaft 17. The particular type of centrifugal governor illustrated in Fig. 1 consists essentially of the two contacts 25 and 26, fixed respectively on supporting arms 27 and 28 in turn secured to flat springs 29 and 30 mounted on posts 31 and 32 near the periphery of supporting disc 33, secured to motor shaft 17. Inner spring 30 is adjustable by screw 34 and outer spring 29 is somewhat more flexible than inner spring 30, so that the centrifugal force acting on the outer spring 29 when the motor speed increases above a given rate, causes contact 25 to separate from contact 26, thus inserting resistance 24 in the motor circuit, which reduces its speed. For purposes of this invention, arm 27 is magnetic material, the brass arm usually furnished being replaced by one of iron or steel. Any other suitable form of governor may be employed with equal facility.

As shown in Fig. 2, the electromagnet coil 22 is wound around an iron-clad core 35 having a flanged extension 36 and supported and surrounded by a concentric iron shell 37 mounted on a suitable fixed base 38. The core assembly is mounted with the axis of coil 22 colinear with the axis of motor shaft 17 and in spaced relation to contacts 25 and 26, so that the radial magnetic field thus provided produces the maximum effect on the magnetic material supporting arm 27 of contact 25. Condensers 39, 40, 41 and resistances 42, 43, are provided in each circuit for spark suppression across their respective contacts.

When electromagnet coil 22 is energized, the effect of the resultant radial field tends to pull arm 27 and consequently contact 25 outwardly, adding to the effect of the centrifugal force of rotation, thereby changing the vibration characteristics of spring 29, with the result that contacts 25 and 26 remain open for a longer period of time. Resistance 24 is thus cut in for a longer period of time, resulting in a decreased equilibrium speed of the motor. Resistance 24 must be chosen so its range of speed control is greater than the regulation in speed of the motor 19 under the full range of load. It must be large enough to hold the motor, which is arranged to normally operate at overspeed, at the desired speed.

In operation, the centrifugal governor serves as a relatively rough control, keeping the number of revolutions of motor 19 at approximately constant rate, so that commutator brush 15 revolves at approximately the same frequency as sector 2 on escapement wheel shaft 1. When the frequencies are in synchronism but 180° out of phase, because relay armature 9 reverses every half cycle, brush 15 is in contact with commutator segment 13 while the other segment 12 is electrically connected to supply, leaving the circuit of electromagnet coil 22 open, and vice versa.

It is evident that when this phase relation changes, there will be a portion of each half-cycle during which the brush 15 will engage a segment 12 or 13 which is still connected in circuit. During this period the electromagnet 22 is energized, the contacts 25 and 26 opened, the resistance cut in, so that the frequency of motor 19 revolutions is decreased, and the brush frequency is decreased. This correction automatically maintains the two frequencies of the escapement shaft 1 and motor 19 in synchronism as follows: As the load changes, the rate of motor 19 revolution will tend to change, so the frequency of brush 15 revolution will correspondingly tend to vary. As the brush frequency tends to increase, the phase relation changes from 180° toward 0°, thus varying the period of correction from zero through the entire cycle.

This phase relation may be more clearly indicated by the cyclic diagram of Fig. 3, in which it is convenient to represent the cycle of the control escapement shaft 1, which is also the cycle of relay 8 operation, by a dotted arrow or vector 44, which revolves at constant frequency in an assumed counter-clockwise direction 180° ahead of vector 15, representing brush 15 cycle. The reference characters are used as in Fig. 1 to indicate identical elements. As the frequency of the brush 15 tends to increase, the phase angle $x$ may decrease from 180° to some angle $x_1$, vector 15 thus occupying a new position, 15', in relation to vector 44, while both revolve at the same frequency until conditions establish some new phase relation as indicated at 15'', 15''', or otherwise.

It is evident that as the phase angle decreases from 180° to 0°, the period of correction for each half-cycle increases from zero through the entire cycle. Brush vector 15 will never lag more than 180° out of phase because the motor 19 and resistance 24 are selected so as to prevent the occurrence of such a condition under normal operating conditions. Brush vector 15 will never lead vector 4, for when phase angle $x$ has decreased to 0, the correction is continuously applied and is sufficient, due to selected magnitude of resistance 24, to momentarily decrease the brush frequency until the phase angle $x$ is lagging. Although the phase relation may thus vary between these limits, the applied correction prevents the frequencies from getting out of synchronism. Revolutions of the motor 19 are thus synchronized with the clock escapement shaft 1.

The total number of revolutions which the motor 19 can gain, regardless of the length of time of operation, cannot exceed that which is permitted by the reduction gear 18 during one-half cycle of brush 15 revolution. The phase angle $x$ will fluctuate around 90° when the median conditions of load, temperature and voltage prevail and will vary above and below this value as these conditions change. For example, if it is desired to operate a motor 19 at a frequency of 80 revolutions per second, the motor is chosen to run at an ungoverned overspeed, such as 100 revolutions per second, so that it will operate at slight overspeed under conditions of maximum load plus extreme line voltage fluctuation. Resistance 24 is large enough so that even at minimum load it can reduce the speed of motor 19 sufficiently. The clock escapement shaft 1 oscillates at 2 cycles per second, so that reduction gear 18 is chosen to revolve the brush 15 at 2 cycles per second, when the motor 19 has the desired frequency of 80 revolutions per second. The possible gain in total number of revolutions of motor 19 for the extreme range of control is the equivalent of one half cycle, or one quarter second, namely, 20 revolutions. At 90° phase angle, this gain or loss is 10 revolutions. Since all corrections are made under instantaneous conditions, changes due to temperature variations are ineffective to introduce an error.

While a preferred embodiment of the invention has been illustrated and described herein, it is to be understood that the invention is not limited thereby, but is susceptible of changes and detail within the scope of the appended claims.

I claim:

1. In a device for synchronizing the movements of a secondary member wtih the movements of a primary member, the combination of a pair of spaced contacts, a brush driven by the secondary member to alternately engage said contacts, means actuated by the primary member for alternately energizing said contacts, means responsive to the speed of the secondary member for regulating the speed of the same, and means energized upon engagement of said brush with one of said energized contacts for controlling the speed responsive means.

2. In a device for synchronizing the movements of a secondary member with the movements of a primary member, the combination of a pair of spaced contacts, a brush driven by the secondary member to alternately engage said contacts, means actuated by the primary member for alternately energizing said contacts, a speed governor for the secondary member, and means energized upon engagement of said brush with one of said contacts for controlling said governor.

3. In a device for synchronizing the movements of a secondary member with the movements of a primary member, the combination of a pair of spaced contacts, a brush driven by the secondary member to alternately engage said contacts, means actuated by the primary member for alternately energizing said contacts, a speed governor for the secondary member, an electromagnetic means controlling said governor, and means energized upon engagement of said brush with one of said contacts for energizing said electromagnetic means.

4. In a device for synchronizing the rotation of an electric motor with the movements of a primary member, the combination of a switch for inserting a resistance in the motor circuit to reduce the speed of the motor, a pair of spaced contacts, means driven by the primary member for alternately energizing said contacts, a brush driven by the motor for alternately engaging said contacts, said brush normally engaging deenergized contacts when the motor is synchronized with the primary member, and electromagnetic means controlling said switch energized by engagement of said brush with an energized contact.

5. In a device for synchronizing the rotation of an electric motor with the movements of a primary member, the combination of a switch for inserting a resistance in the motor circuit to reduce the speed of the motor, a pair of spaced contacts, means driven by the primary member for alternately energizing said contacts, a brush driven by the motor for alternately engaging said contacts, said brush normally engaging deenergized contacts when the motor is synchronized with the primary member, a governor responsive to the speed of the motor for controlling said switch, and electromagnetic means controlling said governor and energized by engagement of said brush with an energized contact.

6. In a device for synchronizing a governor-controlled electric motor with an escapement, the combination of a commutator having two spaced segments, means actuated by the escapement for alternately energizing said segments, a rotary brush driven by the motor over said commutator, said brush being arranged to engage a deenergized segment when the motor is in synchronism with the escapement, and electromagnetic means controlling the governor of said motor and energized by engagement of said brush with an energized segment of said commutator.

7. In a device for synchronizing the rotation of an electric motor with the movements of a primary member, the combination of a switch for inserting a resistance in the motor circuit to reduce the speed of the motor, a pair of spaced contacts, means driven by the primary member for alternately energizing said contacts, a brush driven by the motor for alternately engaging said contacts, said brush normally engaging deenergized contacts when the motor is synchronized with the primary member, a governor responsive to the speed of the motor for controlling said switch, an armature on the speed responsive part of said governor, a stationary electromagnetic means adjacent said governor for electromagnetic cooperation with the armature thereof, and connections between said electromagnetic means and said contacts, whereby energization of one of said contacts by said brush energizes said electromagnetic means to control the movement of the armature of said governor.

CLIFTON T. FOSS.